B. SWAN & E. E. STUART.
HORN FOR USE ON MOTOR CARS AND THE LIKE.
APPLICATION FILED JUNE 17, 1910.
987,772.
Patented Mar. 28, 1911.
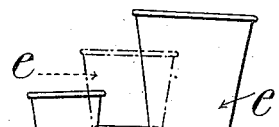
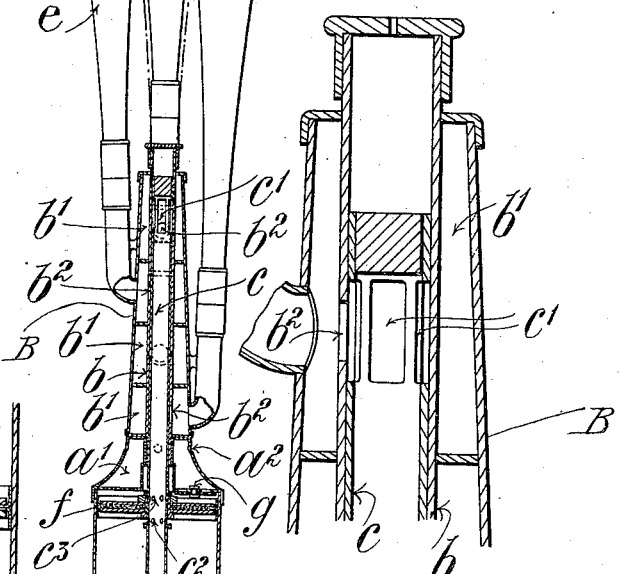
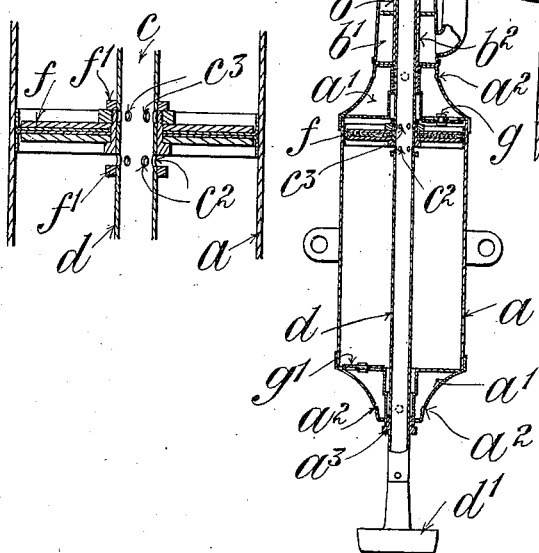
WITNESSES:
E. B. Corcoran
H. J. Corcoran
INVENTORS.
B. Swan & E. E. Stuart.
by Herbert W. Jenner.
Attorney.
THE NORRIS PETERS CO., WASHINGTON, D. C.

UNITED STATES PATENT OFFICE.

BENJAMIN SWAN AND ERNEST EDGAR STUART, OF ST. ALBANS, ENGLAND.

HORN FOR USE ON MOTOR-CARS AND THE LIKE.

987,772.　　　　　Specification of Letters Patent.　　Patented Mar. 28, 1911.

Application filed June 17, 1910.　Serial No. 567,387.

*To all whom it may concern:*

Be it known that we, BENJAMIN SWAN, residing at "Golspie," Marlborough Road, and ERNEST EDGAR STUART, residing at 2 College road, "The Camp," St. Albans, in the county of Herts, England, both subjects of the King of Great Britain and Ireland, have invented a new and useful Improved Horn for Use on Motor-Cars and the Like, of which the following is a specification.

This invention relates to an improved horn for use on motor cars and the like and it has for its object producing an instrument that is of simple construction for the quick and certain production of melodious sounds.

In the accompanying drawing, Figure 1 is a view in longitudinal section of a horn constructed according to the present invention, and Figs. 2 and 3 are enlarged detail views also in section.

Throughout the views similar parts are marked with like letters of reference.

The barrel or cylinder $a$ of an air pump terminates at one end in a pipe $b$ adapted to receive a hollow extension $c$ of the piston rod $d$. Surrounding the pipe $b$ are formed a series of air chambers $b^1$ each communicating with the pipe $b$ by means of ports $b^2$ therein. These chambers are formed between an outer tapering tube B and the said pipe $b$. On each of the air chambers $b^1$ is mounted a trumpet $e$, the reed of which being attuned to accord with the amplifying trumpet conical horn or bell $e$ gives a different sound from each of the other reed attuned trumpets. The free end of the extension $c$ is stopped and formed with ports $c^1$ therein adapted to put the interior of said extension $c$ in successive communication with the air chambers $b^1$ of the trumpets $e$ by means of the ports $b^2$ in the pipe $b$. The piston $f$ adapted to be reciprocated within the cylinder $a$ is mounted on the piston rod $d$ so as to have a limited movement thereon in order to put the cylinder $a$ on one side of the piston $f$ in communication with the interior of the extension $c$ through ports $c^2$ therein or the cylinder on the other side of the piston through ports $c^3$ therein. The piston $f$ thus sliding— within limits defined by stops or collars $f^1$— on the piston rod serves as a valve to alternately open and close the ports $c^2$ and $c^3$ on reciprocating the piston, so making the pump double acting. Air admission valves $g$, $g^1$ are provided on the front and back covers of the cylinder $a$ in communication with air chambers $a^1$ formed on the ends of the cylinder, which chambers $a^1$ are open to the atmosphere by holes $a^2$ therein. The back end of the cylinder through which the piston rod $d$ projects is formed with a stuffing box $a^3$ and the free end of the piston rod terminates in a handle $d^1$.

It will be seen in operation that on the supposition that the piston $f$ is in the position shown on Fig. 1 and the back end of the cylinder is open to the extension $c$ through the ports $c^2$, on pulling the piston $f$ air will be compressed and passing through the ports $c^2$ and $c^1$ will enter the first air chamber $b^1$ and sound the trumpet connected thereto. On continued motion of the piston the other trumpets will be successively sounded until the piston reaches the back end. On reversal of the motion the piston remains momentarily stationary until it contacts one of the stops $f^1$, whereby the ports $c^3$ are opened and the ports $c^2$ are closed. On continued pushing the trumpets are again successively sounded but of course in the reverse order. Where one or more pistons and tubes are used the reeds may be sounded successively or two or more jointly as their positions on the tubes are determined.

What we claim as our invention and desire to secure by Letters Patent is:—

1. In a sounding horn, the combination, with an air compressing pump provided with a piston, and an air tube connected to the pump cylinder and provided with an outlet port, of a sounding trumpet connected to the said tube and its port, and a piston valve connected to the said piston and slidable in the said tube to open and close its port.

2. In a sounding horn, the combination, with an air compressing pump provided with a piston, and an air tube connected to the pump cylinder and provided with a series of outlet ports; of a series of sounding trumpets connected to the said tube and its ports, and a piston valve connected to the said piston and slidable in the said tube and operating to open its ports one after another.

3. In a sounding horn, the combination, with an air compressing cylinder, a piston slidable therein, and an air tube connected to the said cylinder and provided with a series of outlet ports; of a series of sounding trumpets connected to the said tube and its ports, and a tubular piston-rod operatively connected with the said piston and slidable in the said tube and provided with
5 a port for admitting compressed air to the said trumpets through the said series of ports one after another.

In testimony whereof we have signed our names in the presence of two subscribing witnesses.

BENJAMIN SWAN.
ERNEST EDGAR STUART.

Witnesses:
A. MILLWARD FLACK,
G. V. SYMES.